(12) United States Patent
Cornelius

(10) Patent No.: US 10,784,695 B2
(45) Date of Patent: Sep. 22, 2020

(54) REDUCING TRANSIENT CURRENTS IN RECEPTACLE CIRCUITRY DURING PLUG EXTRACTION

(71) Applicant: Apple Inc., Cupertino, CA (US)

(72) Inventor: William P. Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 15/236,775

(22) Filed: Aug. 15, 2016

(65) Prior Publication Data

US 2017/0047749 A1   Feb. 16, 2017

Related U.S. Application Data

(60) Provisional application No. 62/204,964, filed on Aug. 13, 2015.

(51) Int. Cl.
*H02J 7/00*   (2006.01)

(52) U.S. Cl.
CPC .......... *H02J 7/0045* (2013.01); *H02J 7/0029* (2013.01); *H02J 7/00* (2013.01); *H02J 7/007* (2013.01)

(58) Field of Classification Search
CPC ........... H02J 7/0045; H02J 7/029; H02H 3/20
USPC ....................................................... 320/107
See application file for complete search history.

(56) References Cited

U.S. PATENT DOCUMENTS

| | | | | |
|---|---|---|---|---|
| 4,697,907 A * | 10/1987 | Terui | ...................... | G03B 15/05 |
| | | | | 315/241 P |
| 4,964,011 A * | 10/1990 | Sternglass | .............. | G11C 5/143 |
| | | | | 307/66 |
| 5,994,875 A * | 11/1999 | Lee | ........................ | H02J 7/0077 |
| | | | | 320/132 |
| 7,394,638 B2 * | 7/2008 | Ahmad | ............... | H01L 27/0285 |
| | | | | 361/111 |
| 7,706,112 B2 * | 4/2010 | Crawley | .................. | H02H 9/04 |
| | | | | 361/111 |
| 8,749,173 B1 * | 6/2014 | Melanson | .............. | H05B 45/37 |
| | | | | 315/307 |
| 10,084,269 B2 | 9/2018 | Cornelius et al. | | |
| 2002/0067145 A1 * | 6/2002 | Ribarich | ............ | H05B 41/2828 |
| | | | | 315/291 |
| 2002/0186070 A1 * | 12/2002 | Wall | .......................... | H02J 7/00 |
| | | | | 327/530 |
| 2009/0001938 A1 * | 1/2009 | Vantu | .................... | H02J 7/0036 |
| | | | | 320/165 |
| 2009/0284244 A1 * | 11/2009 | Li | ........................... | H04M 1/24 |
| | | | | 323/318 |
| 2010/0073837 A1 * | 3/2010 | Predtetchenski | ... | G06F 13/4072 |
| | | | | 361/91.5 |
| 2010/0127782 A1 * | 5/2010 | Karp | ................... | G06F 17/5063 |
| | | | | 330/298 |
| 2011/0051303 A1 * | 3/2011 | Migliavacca | ......... | H02J 7/0031 |
| | | | | 361/91.5 |
| 2011/0260680 A1 * | 10/2011 | Veselic | ................. | H02J 7/0068 |
| | | | | 320/107 |

(Continued)

*Primary Examiner* — Richard Isla
*Assistant Examiner* — Tessema Kebede
(74) *Attorney, Agent, or Firm* — Kilpatrick Townsend & Stockton, LLP

(57) ABSTRACT

Circuits, methods, and apparatus that prevent or limit undesirable transient currents that may occur during a connector insert extraction and may damage electrical components connected to the connector receptacle.

15 Claims, 15 Drawing Sheets

(56) References Cited

U.S. PATENT DOCUMENTS

2012/0194075 A1* 8/2012 Iwai .................. H05B 33/0884
                                                        315/119
2013/0286523 A1* 10/2013 Mullins ................ H01R 13/641
                                                        361/93.9

* cited by examiner

REDUCING TRANSIENT CURRENTS IN RECEPTACLE CIRCUITRY DURING PLUG EXTRACTION

CROSS REFERENCE TO RELATED APPLICATIONS

This application claims the benefit of U.S. provisional patent application No. 62/204,964, filed Aug. 13, 2015, which is incorporated by reference.

BACKGROUND

The amount of data transferred between electronic devices has grown tremendously the last several years. Large amounts of audio, streaming video, text, and other types of data content are now regularly transferred among desktop and portable computers, media devices, handheld media devices, displays, storage devices, and other types of electronic devices.

Power may be transferred with this data, or power may be transferred separately. Power and data may be conveyed over cable assemblies. Cable assemblies may include a cable that may have wire conductors, fiber optic cables, or a combination of these or other conductors. Cable assemblies may also include a connector insert at each end of the cable, though other cable assemblies may be connected or tethered to an electronic device in a dedicated manner. The connector inserts of the cable assemblies may be inserted into connector receptacles in the communicating electronic devices to form power and data pathways between the communicating and power sharing devices.

On occasion, a connector insert may be removed from a connector receptacle in an electronic device while power and signal voltages are being applied through the cable assembly. As the connector insert is removed, contacts and grounding structures in the connector insert may come into electrical contact with various contacts and structures in the corresponding connector receptacle. These transient electrical connections may form undesirable current pathways that may damage input electrical components associated with the connector receptacle and housed in the electronic device.

Thus, what is needed are circuits, methods, and apparatus that prevent or limit undesirable transient currents that may occur during a connector insert extraction from a connector receptacle that may damage electrical components connected to the connector receptacle.

SUMMARY

Accordingly, embodiments of the present invention may provide circuits, methods, and apparatus that prevent or limit undesirable transient currents that may occur during a connector insert extraction from a connector receptacle that may damage electrical components connected to the connector receptacle.

In a conventional Universal Serial Bus type-C (USB Type-C) connector receptacle, VBUS power contacts and ground contacts may be placed the same distance from the front of a connector receptacle tongue such that they simultaneously disconnect from corresponding contacts in a connector insert when the connector insert is removed from the connector receptacle. But there may be variations associated with the lengths and placement of the VBUS power and ground contacts in the connector receptacle and connector insert. These variations may result in VBUS power being applied to the electronic device after ground has been disconnected as the connector insert is removed from a connector receptacle. At the same time, a signal contact on the connector receptacle tongue may become grounded when an electromagnetic-interference (EMI) contact on the connector insert electrically connects to the signal contact during extraction of the connector insert. When this occurs after the electronic device was being charged, current may flow from the VBUS power supply, through a charging regulator, through an electrostatic-discharge (ESD) diode that is integrated on an integrated circuit connected to the connector receptacle, and out through the grounded signal contact. This current may damage the integrated ESD diode or related components, or both, and therefore may damage the integrated circuit.

An illustrated embodiment of the present invention may provide an under-voltage lockout circuit that detects a drop in a received VBUS supply and acts to provide a high impedance in series with the current path through the ESD diode. Specifically, when VBUS remains connected while ground is disconnected, the ground may rise until it is clamped by the ESD diode. At this point, the net VBUS voltage, which may be the difference in voltage between VBUS and ground as seen by the under-voltage lockout circuit, drops by a diode drop. The net VBUS voltage may continue to decline from that voltage as capacitances associated with VBUS are discharged. When the net VBUS reaches a threshold voltage, an under-voltage lockout circuit may change an impedance of the charging regulator such that the current flow in the diode is greatly reduced or shut off. The threshold may be set relative to a recent average of the net VBUS voltage, or it may be set relative to ground. Setting the threshold relative to a recent average VBUS voltage may make the performance of the under-voltage lockout circuit independent of the magnitude of the VBUS voltage received before the connector insert disconnection. In these embodiments of the present invention, the threshold should not be set to be a value below a present value of VBUS where the value of the threshold tracks changes in VBUS. If this is done, the threshold may be reduced along with VBUS and the threshold may never be reached. Accordingly, the threshold may be relative to a recent average value of VBUS and is set relative to ground and does not immediately track changes in VBUS. This threshold may be generated in various ways. For example, a threshold voltage may be generated relative to VBUS such that the threshold voltage is a threshold amount below VBUS, but a capacitor from the threshold voltage to ground may keep the threshold voltage relatively constant as VBUS decreases. This capacitor may thus store a recent average value of VBUS that may not decrease immediately along with VBUS as VBUS decreases in voltage following a disconnection from a connector receptacle. While it may be undesirable to have the threshold voltage track VBUS too closely, the threshold may change as the VBUS voltage changes in magnitude between two or more permissible VBUS voltage levels.

Another illustrated embodiment of the present invention may provide an under-current lockout circuit that detects a drop in VBUS current and acts to provide a high impedance in series with the current path through the ESD diode. Various embodiments may detect this current drop in various ways. For example, an embodiment of the present invention may use a single threshold to detect a drop in VBUS current. This single threshold may be fixed or it may be dynamic. That is, it may be fixed to a set value or it may dynamically vary as a function of a recent average value of VBUS current. When the VBUS current drops below the threshold, a high impedance may be placed in series with the VBUS line to reduce or shut off the VBUS current in the ESD diode. In another embodiment of the present invention, two current thresholds may be used. Again, these may be static or dynamic. This dual-threshold arrangement may have less sensitivity to transient reductions in VBUS current. For example, a detect circuit may determine whether the current dropped from a first threshold to a second threshold within a set amount of time. If so, it may be determined that a disconnection has occurred and a high impedance may be placed in series with the VBUS line to at least reduce or shut off the VBUS current in the ESD diode. If not, it may be determined that a glitch in the VBUS power supply current has occurred. Once VBUS current has been reduced or shut off, various criteria may be used to allow current to resume flowing. In various embodiments of the present invention, a wait state may be imposed before current may be drawn from VBUS. For example, a wait time of 1, 5, 10, or 20 ms may be imposed before current may be drawn from VBUS following a disconnect. In these and other embodiments of the present invention, the net VBUS voltage (VBUS minus the local ground, which may be floating, as seen by the charging regulator circuit) may be monitored to determine whether full connection has again been made to a charging circuit. If the net VBUS voltage is not stable, but is instead decreasing or drooping, then the high-impedance state may be maintained. If the net VBUS voltage is stable, then the high-impedance may be removed and VBUS current flow may resume. Either or both of these or other techniques may be combined. For example, a wait time may be imposed. Following the wait time, the net VBUS voltage may be monitored to determine whether full connection has again been made to a charging circuit such that the net VBUS is stable.

Another illustrated embodiment of the present invention may detect that a disconnection between a connector insert and a connector receptacle has occurred by monitoring a voltage across an ESD diode directly. Again, when VBUS remains connected while ground is disconnected, the ground voltage may rise until it is clamped by the ESD diode. A comparator may be used to detect the increase in ESD diode voltage and may trip as the diode begins to conduct. The comparator may then be used to provide a high impedance in series with the current path through the ESD diode in order to protect the diode and associated circuitry. Since the diode voltage may drop when its current is reduced or shut off, hysteresis may be needed in the comparator to prevent it from allowing diode current to resume flowing. In other embodiments of the present invention, a state machine that may contain wait one or more wait states may be implemented to prevent this from occurring.

Another illustrated embodiment of the present invention may detect that a disconnection between a connector insert and a connector receptacle has occurred by monitoring ground connections between side ground contacts in the connector insert and contacts on sides of a connector receptacle tongue. The connector receptacle tongue side contacts may be AC coupled to ground via capacitors. Current sources may be connected to each connector receptacle tongue side contact. When side ground contacts in a connector insert are in contact with and electrically connected to the connector receptacle tongue side contacts, the connector receptacle tongue side contacts may be grounded through the side ground contacts in the connector insert. This connection may provide a path for the current provided by the current sources to return to ground. An AC path for AC return current may exist from ground in the connector insert, through the side ground contacts in the connector insert, through the connector receptacle tongue side contacts, through the AC coupling capacitors, to ground in the connector receptacle. When the connector insert is removed, the DC ground connection to the connector receptacle tongue side contacts is removed and only the AC path through the coupling capacitors remains. The current sources may then drive the connector receptacle tongue side contacts to a bias voltage. This increase in connector receptacle tongue side contact voltage may be used to detect a connection disconnect. The detected disconnect can be used to provide a high impedance in series with the current path through the ESD diode in order to protect the diode and associated circuitry.

Various embodiments of the present invention may provide a high impedance in series with the current path through the ESD diode. This may be done by placing a switch in parallel with the high impedance in the current path. The switch may be a micro-electronic machine (MEM), a transistor, relay, or other type of switch. This switch may be opened in order to provide the parallel high impedance in series with the current path through the ESD diode and closed to bypass the high impedance. The high impedance may be a resistor, transistor, or other device. Where the high impedance is a transistor, the high impedance may have a variable value. In these or other embodiments of the present invention, the charging circuit in the current path may be arranged to provide a variable impedance. This variable impedance may be increased to provide a high impedance in series with the current path through the ESD diode.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
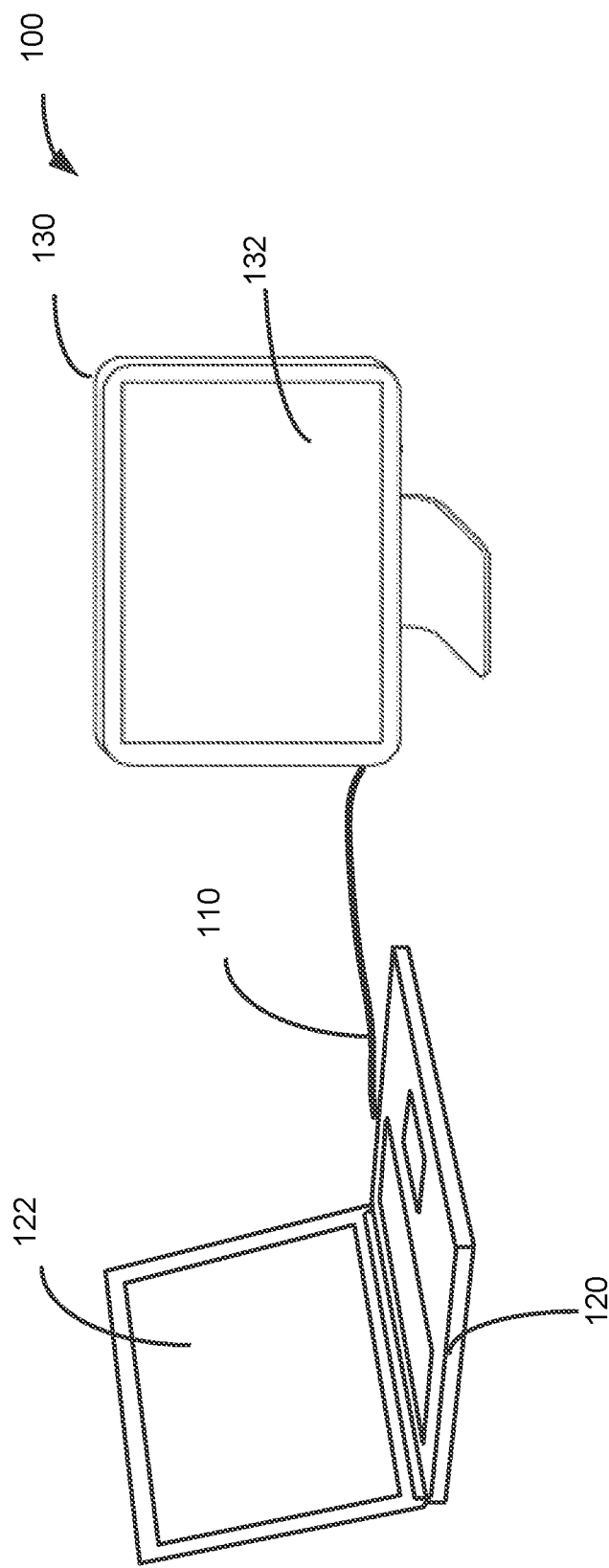
FIG. 1 illustrates an electronic system that may be improved by the incorporation of embodiments of the present invention.

FIG. 1 illustrates an electronic system that may be improved by the incorporation of embodiments of the present invention. This figure, as with the other included figures, is shown for illustrative purposes and does not limit either the possible embodiments of the present invention or the claims.

Electronic system 100 may include cable 110 joining electronic devices 120 and 130. In this example, electronic device 120 may be a laptop or portable computer having screen 122. Electronic device 130 may be a monitor 130 that may include screen 132. In other embodiments of the present invention, cable 110 may couple various types of devices, such as portable computing devices, tablets, desktop computers, all-in-one computers, cell phones, smart phones, media phones, storage devices, portable media players, wearable computing devices, navigation systems, monitors power supplies, adapters, and chargers, and other devices. These cables, such as cable 110, may provide pathways for signals and power compliant with USB Type-C interfaces. Cable 110 may attach to electronic devices 120 and 130 through connector receptacles provided by embodiments of the present invention. Also, while embodiments of the present invention are particularly well suited to use in circuits for USB Type-C connector receptacles, though these and other embodiments of the present invention may be used in circuits for other types of connector receptacles.

Again, in a conventional USB Type-C connector receptacle, VBUS power contacts and ground contacts may be positioned to have ends that may be the same distance from the front of a connector receptacle tongue such that they simultaneously disconnect from corresponding contacts in a connector insert when the connector insert is extracted from the connector receptacle. But there may be variations associated with the lengths and placement of the VBUS power and ground contacts in the connector receptacle and connector insert. More specifically, there may be variations in the position of an end of a contact relative to a front of a connector insert or connector receptacle tongue. These variations may result in VBUS power being applied to the electronic device after ground has been disconnected as the connector insert is removed. Specifically, an end of a VBUS power contact may be longer than an end of the ground contacts on a tongue. This may mean that as the connector insert is removed while an electronic device housing the connector receptacle is being charged, power may be applied to a VBUS power contact on the tongue in the absence of a ground connection to the ground contacts on the tongue. Similarly, the lengths or positions of contacts in the connector insert may be skewed to achieve the same effect. If this happens when an EMI ground contact engages a signal contact, a large current may flow from the VBUS power supply and VBUS power contact, through an ESD diode that is integrated on an integrated circuit connected to the connector receptacle, and out through the grounded signal contact. This current may damage the integrated ESD diode or related components, or both, and therefore may damage the electrical component. An example of how this electrical configuration may occur in a USB Type-C connector system is shown in the following figure.

Figure 2:
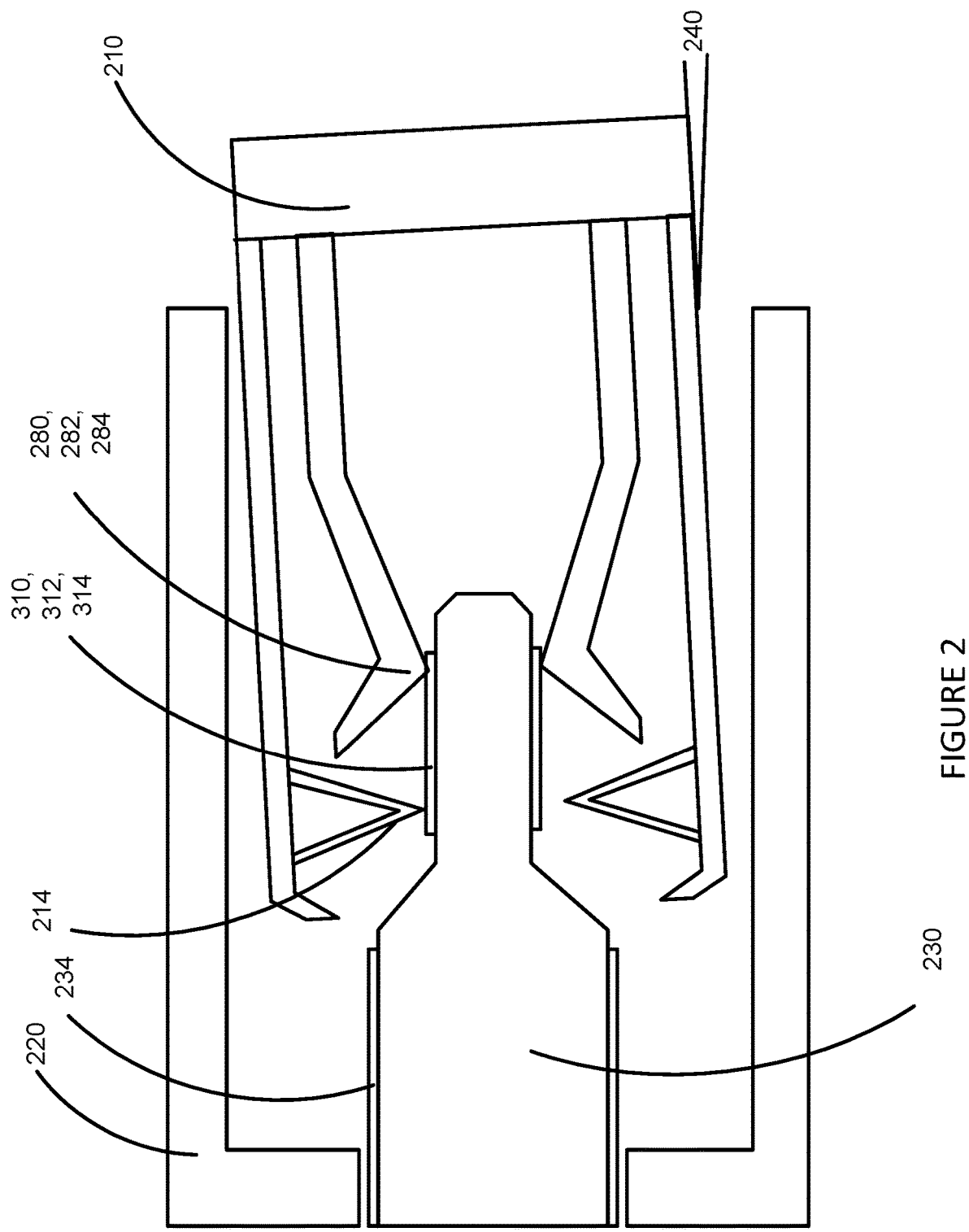
FIG. 2 illustrates a cutaway side view of a connector insert being extracted from a connector receptacle according to an embodiment of the present invention.

FIG. 2 illustrates a cutaway side view of a connector insert being extracted from a connector receptacle according to an embodiment of the present invention. This figure includes connector insert 210 having a number of signal 284, ground 280, and VBUS power contacts 282, and EMI ground contacts 214. This figure also includes a connector receptacle including tongue 230 located in an opening in device enclosure 220. A number of signal 314, ground 310, and VBUS power contacts 312 may be formed on tongue 230. Tongue 230 may further include EMI ground contacts 234.

When connector insert 210 is fully inserted into the connector receptacle, EMI ground contacts 214 on connector insert 210 may mate with EMI ground contact 234 on tongue 230. Similarly, signal 284, ground 280, and VBUS power contacts 282, may be in contact and electrically connected to the signal 314, ground 310, and VBUS power contacts 312 on tongue 230.

As connector insert 210 is removed, connector insert 210 may be tilted at an angle 240. This may cause EMI ground contact 214 in connector insert 210 to electrically connect to a signal contact 314 on tongue 230. Again, if a VBUS power is provided to a VBUS power contact 312 on tongue 230 while the ground contacts 310 are disconnected, current may flow from the VBUS power contact 314, through an ESD diode on an integrated circuits connected to tongue 230, and out of the signal contact 314 through EMI ground contact 214 to ground. A diagram illustrating this configuration is shown in the following figure.

Figure 3:
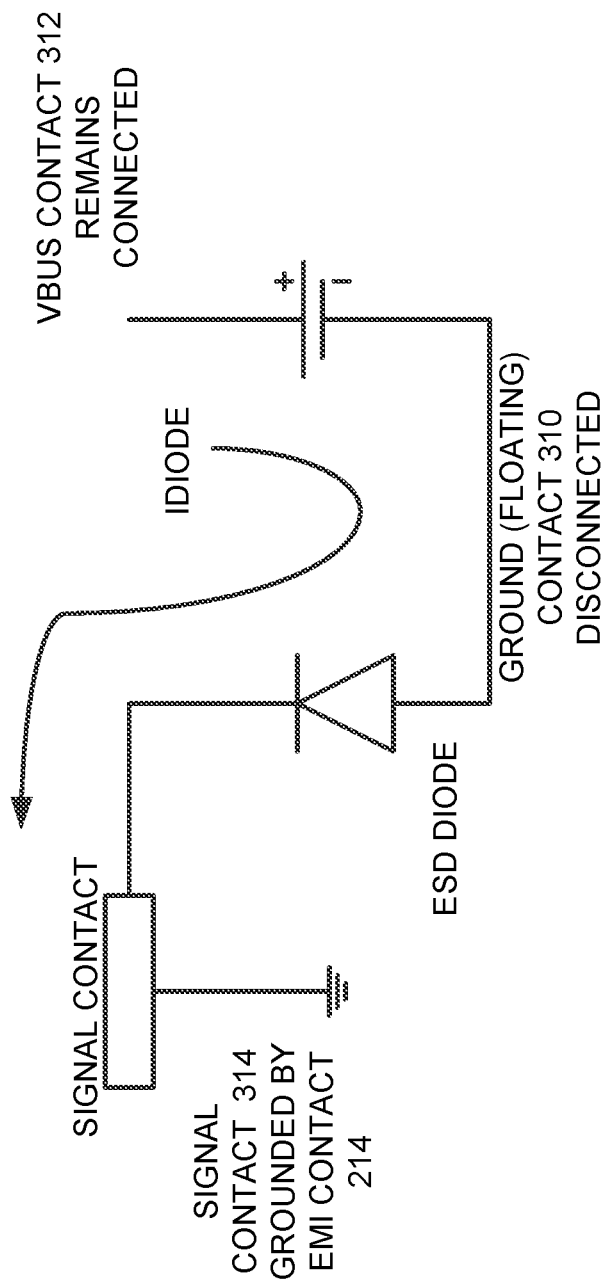
FIG. 3 is a schematic showing a transient high-current path that may be avoided by embodiments of the present invention.

FIG. 3 is a schematic showing a transient high-current path that may be avoided by embodiments of the present invention. In this example, a signal contact and ESD diode may be located on an integrated circuits connected to tongue 230. The ground of the integrated circuit may be connected to one or more of the ground contacts 310 on tongue 230. Similarly, a power supply connection VBUS may be connected to one or more of the VBUS power contacts 312 on tongue 230. Again, VBUS power contacts and ground contacts may nominally be placed at a similar distance from a front edge of a connector receptacle tongue. However, variations in the positions of these contacts, the length of these contacts, or other parameters regarding these contacts, such as an angle of extraction, may result in a VBUS contact remaining electrically connected to a corresponding contact in the connector inserts after the ground contacts have been disconnected from their corresponding contacts. This may result in a VBUS power supply being provided to the integrated circuit connected to or associated with tongue 230. The ground of the integrated circuit may be floating. Specifically, one or more of the VBUS power contacts 312 may be connected to a power supply, while each of the ground contacts 310 may be disconnected. At this same time, one or more EMI contacts 214 in connector insert 210 may come in contact with one or more signal contacts 314. This configuration may provide a path for a current IDIODE that flows from a VBUS power contact 312, through an ESD diode associated with a signal contact on the integrated circuit, and to ground through EMI contacts 214. This current may be sufficiently high as to short or otherwise damage the ESD diode or other circuitry on the integrated circuit.

In various embodiments of the present invention, other circuits, such as charging regulators, rechargeable batteries, and the like may be included in circuitry for a USB Type-C connector receptacle. An example is shown in the following figure.

Figure 4:
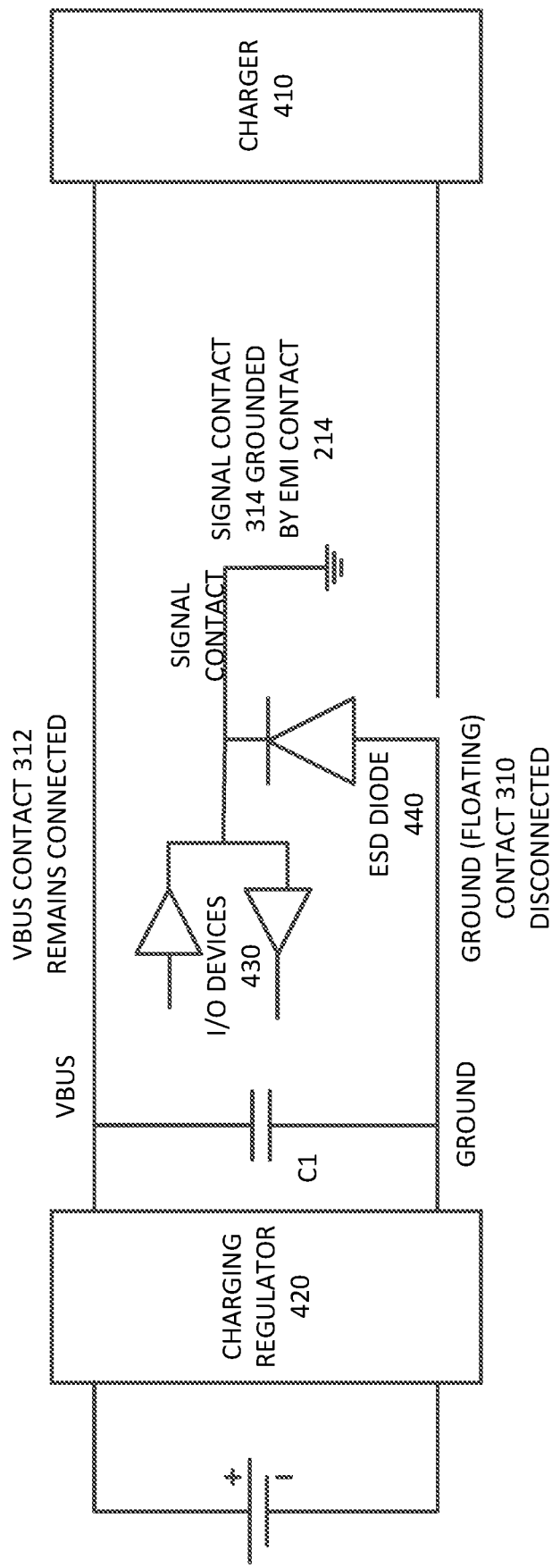
FIG. 4 illustrates a portion of an electronic system that may be improved by the incorporation of an embodiment of the present invention.

FIG. 4 illustrates a portion of an electronic system that may be improved by the incorporation of an embodiment of the present invention. In this example, a first electronic device, specifically charger 410, may provide a voltage VBUS to a second device. The second device may be a portable computer, tablet, phone, or other device. The second device may include a charging regulator 420 that may be configured to charge a battery. This second device may further include an input output circuit including I/O devices 430 and ESD diode 440.

In a specific implementation, the first device may be a charger 410 that provides a VBUS power supply on VBUS contacts and ground on the ground contacts of a USB Type-C connector receptacle. A first connector insert of a cable may be inserted into the connector receptacle of charger 410 and a second connector insert the cable may be inserted in to a USB Type-C connector receptacle on the second device. The USB Type-C connector receptacle on the second device may receive the VBUS power supply on VBUS contacts and the ground on the ground contacts of a USB Type-C connector receptacle. Charging regulator 420, its battery, I/O devices 430, and the ESD diode 440 may be circuitry that is associated with the connector receptacle on the second device. These and the other included circuits may be formed on one or more integrated circuits. For example, ESD diode 440 can be formed on a first integrated circuit while charging regulator 420 can be formed on either the first integrated circuit or a second integrated circuit.

As the second connector insert is removed from the second device, VBUS contacts may remain connected, while a signal contact 314 may be grounded by EMI contact 214. If this happens while ground contacts 310 are disconnected, a current may flow through ESD diode 440. Specifically, current may flow from charger 410 via the VBUS line to charging regulator 420. This current may continue through charging regulator 420 to the floating ground, and through the ESD diode 440 to the signal contact and to ground through the EMI contact in the connector insert. Accordingly, embodiments of the present invention may seek to reduce or limit this current flow to prevent damage to ESD diode 440 or to other components associated with the connector receptacle in the second device. An example is shown in the following figure.

Figure 5:
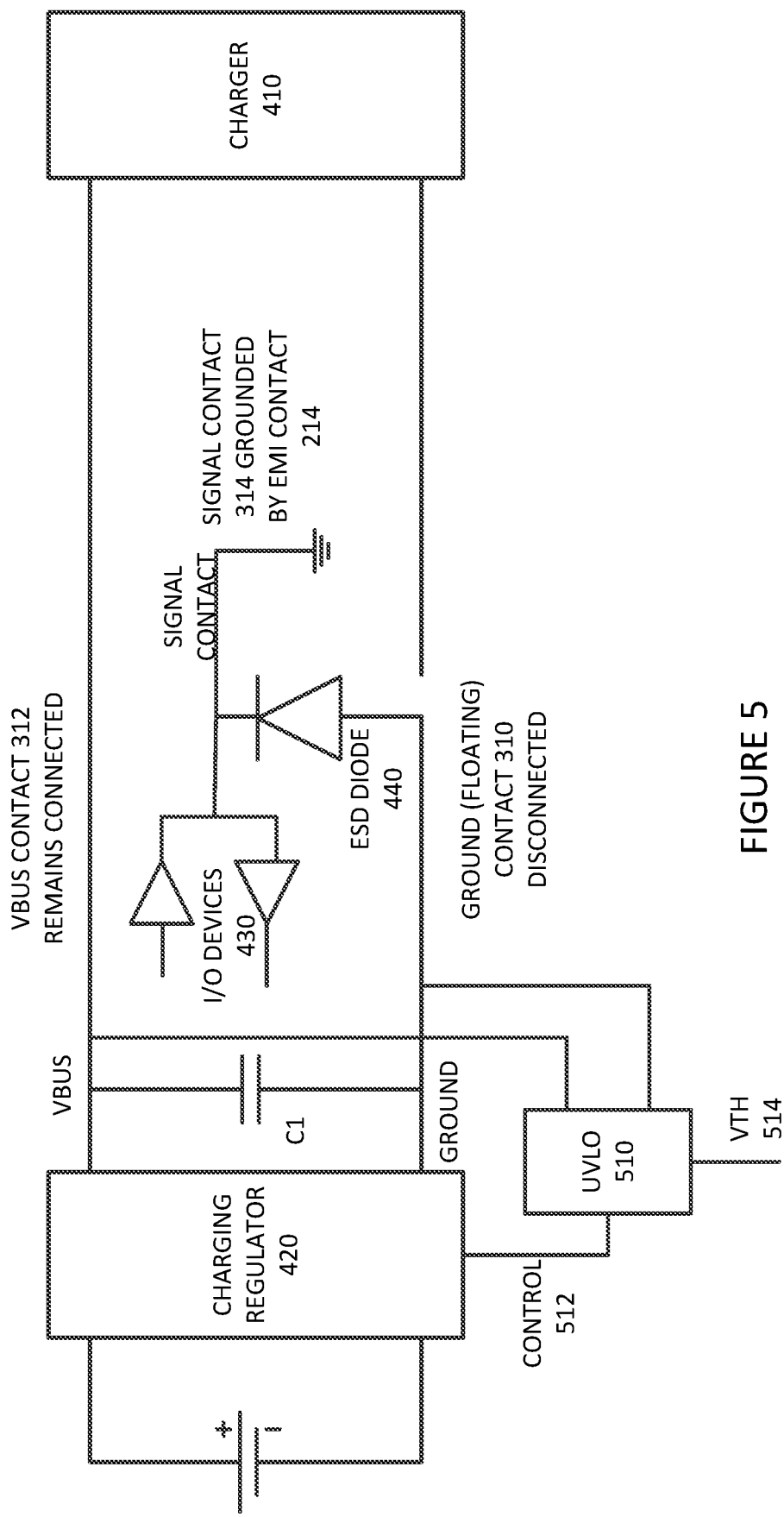
FIG. 5 illustrates circuitry for a connector receptacle according to an embodiment of the present invention.

FIG. 5 illustrates circuitry for a connector receptacle according to an embodiment of the present invention. As before, charger 410 may provide power on VBUS to charging regulator 420. Charging regulator 420 may charge its rechargeable battery. During a disconnection of a connector insert from a connector receptacle associated with charging regulator 420, the VBUS connection may remain intact while the ground contacts are disconnected. If that happens at the same time as a signal contact on the connector receptacle is grounded by an EMI contact in the connector insert, current may flow through ESD diode 440. Specifically, current may flow from charger 410 through the VBUS line, through charging regulator 420, and a through ESD diode 440 to ground via the signal contact and EMI contact. As this current flows, the ground of the charging regulator 420 may rise. This rising ground voltage may reduce the net VBUS voltage, that is, it may reduce the voltage difference between VBUS and ground as seen by charging regulator 420.

Accordingly, embodiments of the present invention may employ an under-voltage lockout circuit 510. This under-voltage lockout circuit may compare the net VBUS voltage and to a threshold voltage VTH received on line 514. When the net VBUS voltage drops below the threshold voltage, the under-voltage lockout circuit 510 may provide a control signal on line 512 to charging regulator 420. In response to the control signal on line 512, the charging regulator 420 may increase the impedance between its VBUS and ground terminals. This high impedance state may effectively reduce or block current flow from reaching ESD diode 440. Timing diagrams illustrating the operation of the under-voltage lockout circuit 510 are shown in the following figures.

Figure 6:
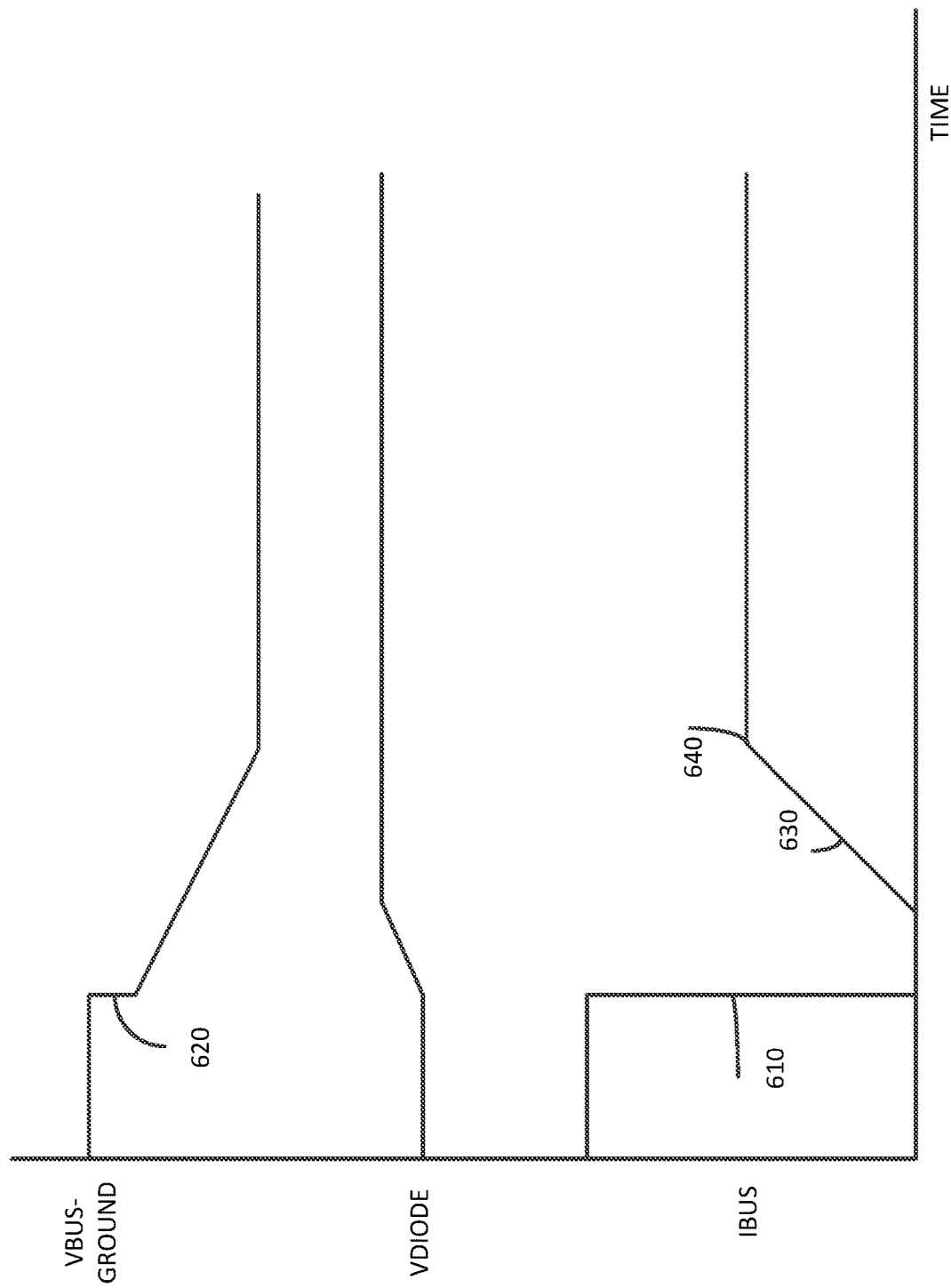
FIG. 6 is a timing diagram showing voltages and currents in the circuits of FIG. 5 in the absence of an under-voltage lockout circuit.

FIG. 6 is a timing diagram showing voltages and currents in the circuits of FIG. 5 in the absence of an under voltage lockout circuit. During a disconnection, as ground is initially removed, the current provided by the VBUS power supply may drop at point 610. Following this, the net VBUS voltage may drop at edge 620. This drop of VBUS voltage may begin to provide a voltage VDIODE across the ESD diode 440. Once the ESD diode 440 reaches a threshold voltage, current from the VBUS power supply, which may flow through the charging regulator 420 and ESD diode 440, may begin to increase along ramp 630. At time 640, the current received from the VBUS power supply may begin to stabilize. Also, the net VBUS voltage seen by the charging regulator 420 may similarly begin to stabilize.

Embodiments of the present invention may utilize the under-voltage lockout circuit 510 shown in FIG. 5 to prevent the ESD diode current that may occur following edge 610. Examples of the resulting waveforms are shown in the following figure.

Figure 7:
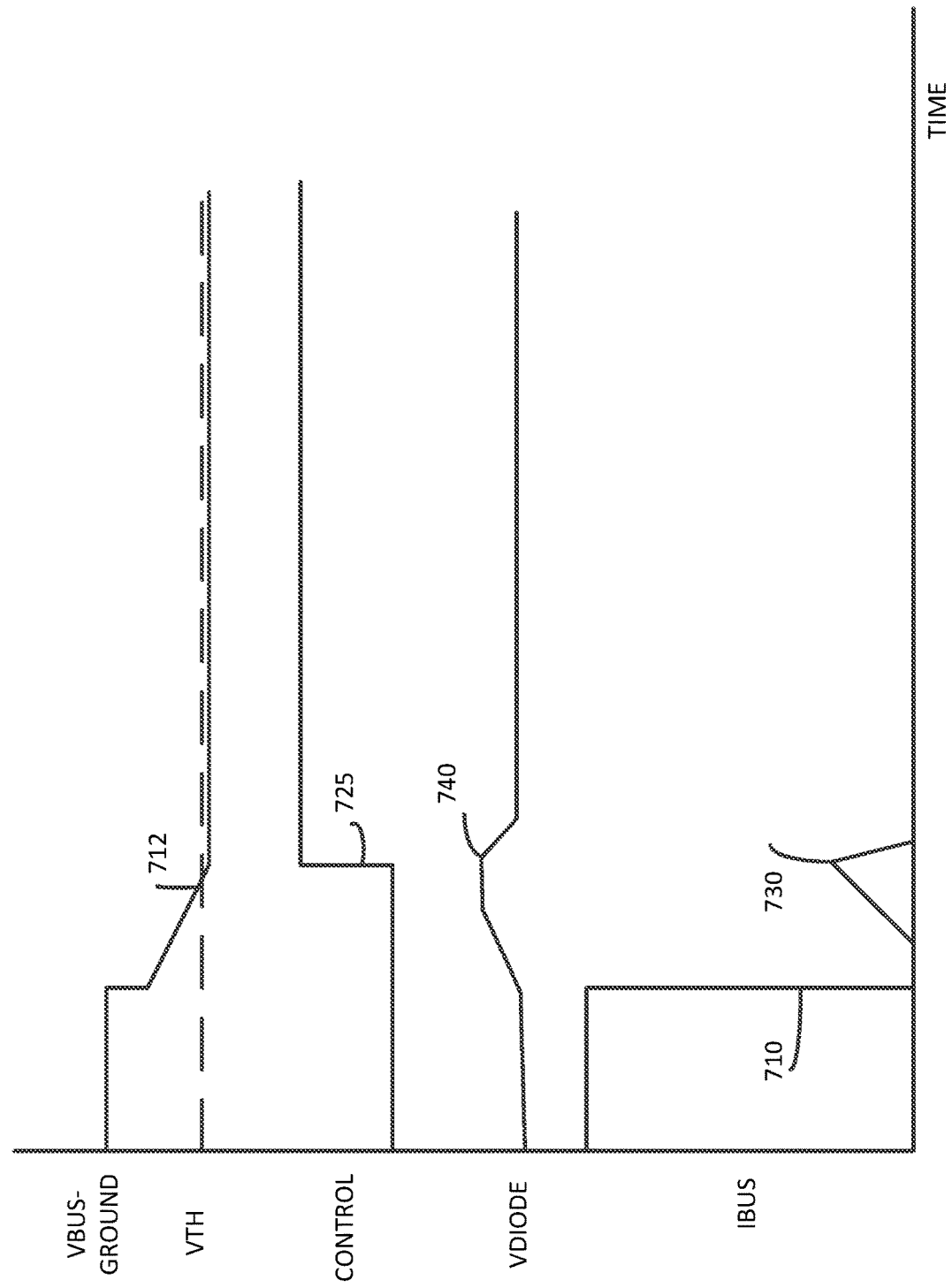
FIG. 7 is a timing diagram showing voltages and currents in the circuits of FIG. 5 when the under-voltage lockout circuit 510 is employed.

FIG. 7 is a timing diagram showing voltages and currents in the circuits of FIG. 5 when the under-voltage lockout circuit 510 is employed. Again, following a disconnection, a current received from the VBUS power supply may drop at edge 710. As before, this may cause the net VBUS voltage to drop. When the net VBUS voltage drops below the threshold voltage at time 712, the control output 512 of the under-voltage lockout circuit 510 may go high at time 725. As the control output 512 goes high, it may cause the charging regulator 520 to provide a high impedance between its power supply input and ground, that is, in series with its power supply input. This may cause the current in ESD diode 440 to drop at time 712. This drop in current may reduce the ESD diode voltage following time 740.

A difficulty may arise in that the VBUS power supply that is received by charging regulator 420 may have one of several different voltage levels, where the received VBUS power supply may change levels during operation. If the received VBUS supply is increased without a corresponding increase in threshold voltage, the threshold voltage might not be reached and the under-voltage lockout circuit 510 might not be utilized. An example of this is shown in the following figure.

Figure 8:
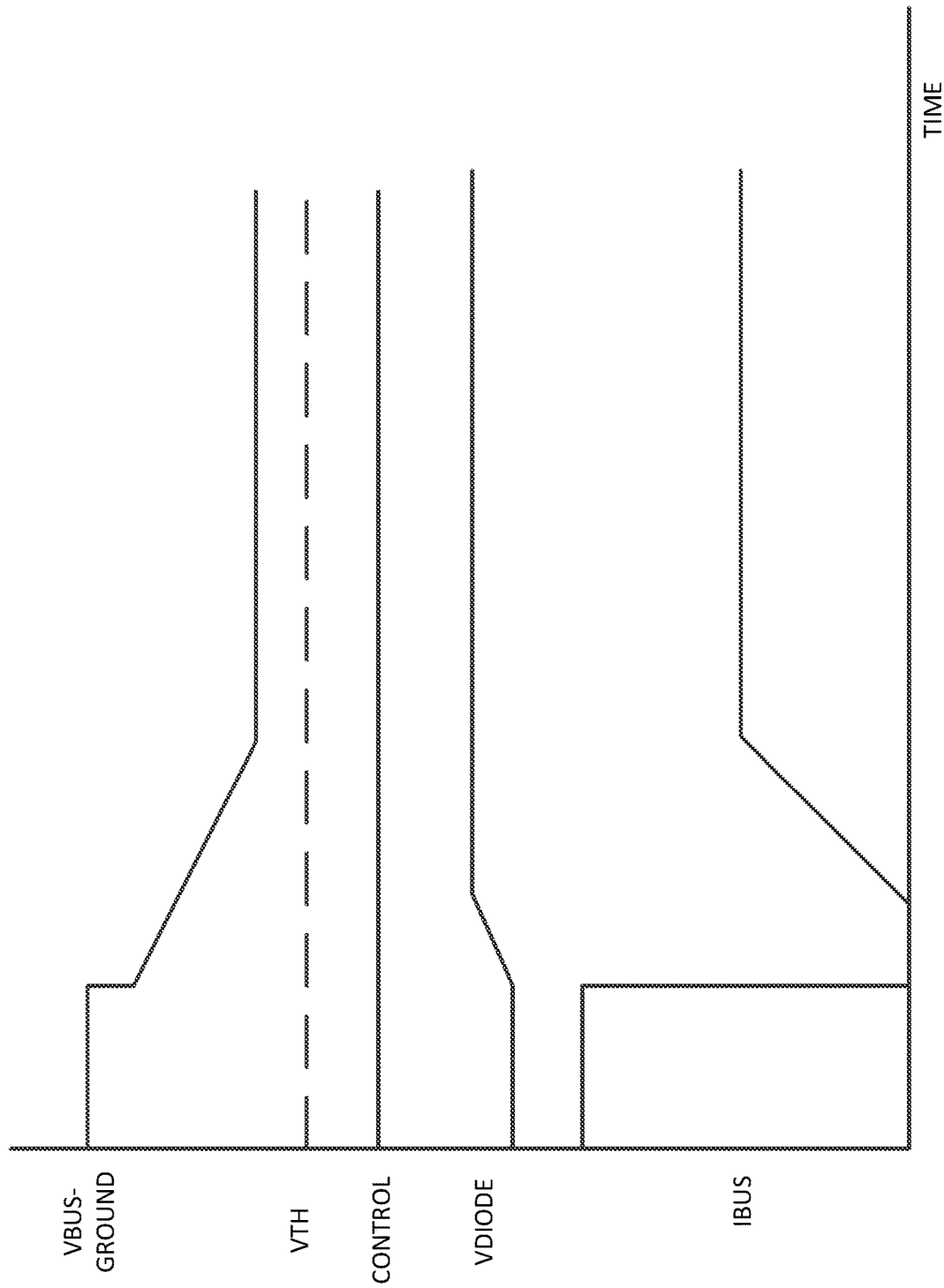
FIG. 8 is a timing diagram showing voltages and currents in the circuits of FIG. 5 where a received VBUS power supply has increased without of a corresponding increase in threshold voltage.

FIG. 8 is a timing diagram showing voltages and currents in the circuits of FIG. 5 where a received VBUS power supply has increased without of a corresponding increase in threshold voltage. In this example the net VBUS voltage does not reach the threshold voltage because the net VBUS voltage was increased while the threshold voltage was not. Because of this, the control output of the under-voltage lockout circuit 510 might not go high and the charging regulator 420 might not enter a high impedance state. Instead, the ESD diode current flows as before, possibly damaging the diode and associated circuitry.

Accordingly, an embodiment of the present invention may provide a threshold voltage that tracks a recent average value of the VBUS power supply. Setting the threshold relative to a recent average level of VBUS may make the performance of the under-voltage lockout circuit independent of the VBUS voltage received before the connector insert disconnection. In these embodiments of the present invention, the threshold should not be set to be a value below a present value of VBUS where the threshold value tracks changes in VBUS. If this is done, the threshold may be reduced along with VBUS and the threshold may never be reached. Accordingly, the threshold may be relative to a recent average value of VBUS. This threshold may be generated in various ways. For example, a threshold voltage may be generated relative to VBUS such that the threshold voltage is a threshold amount below VBUS but does not track changes in VBUS. A capacitor from the threshold voltage to ground may keep the threshold voltage relatively constant as VBUS decreases. This capacitor may thus store a recent average value of VBUS that may not decrease immediately along with VBUS as VBUS decreases in voltage following a disconnection. In various embodiments of the present invention, the threshold may have various values. For example, the threshold may be 2.0, 2.25, 2.5, 3.0, Volts or other voltage. An example is shown in the following figure.

Figure 9:
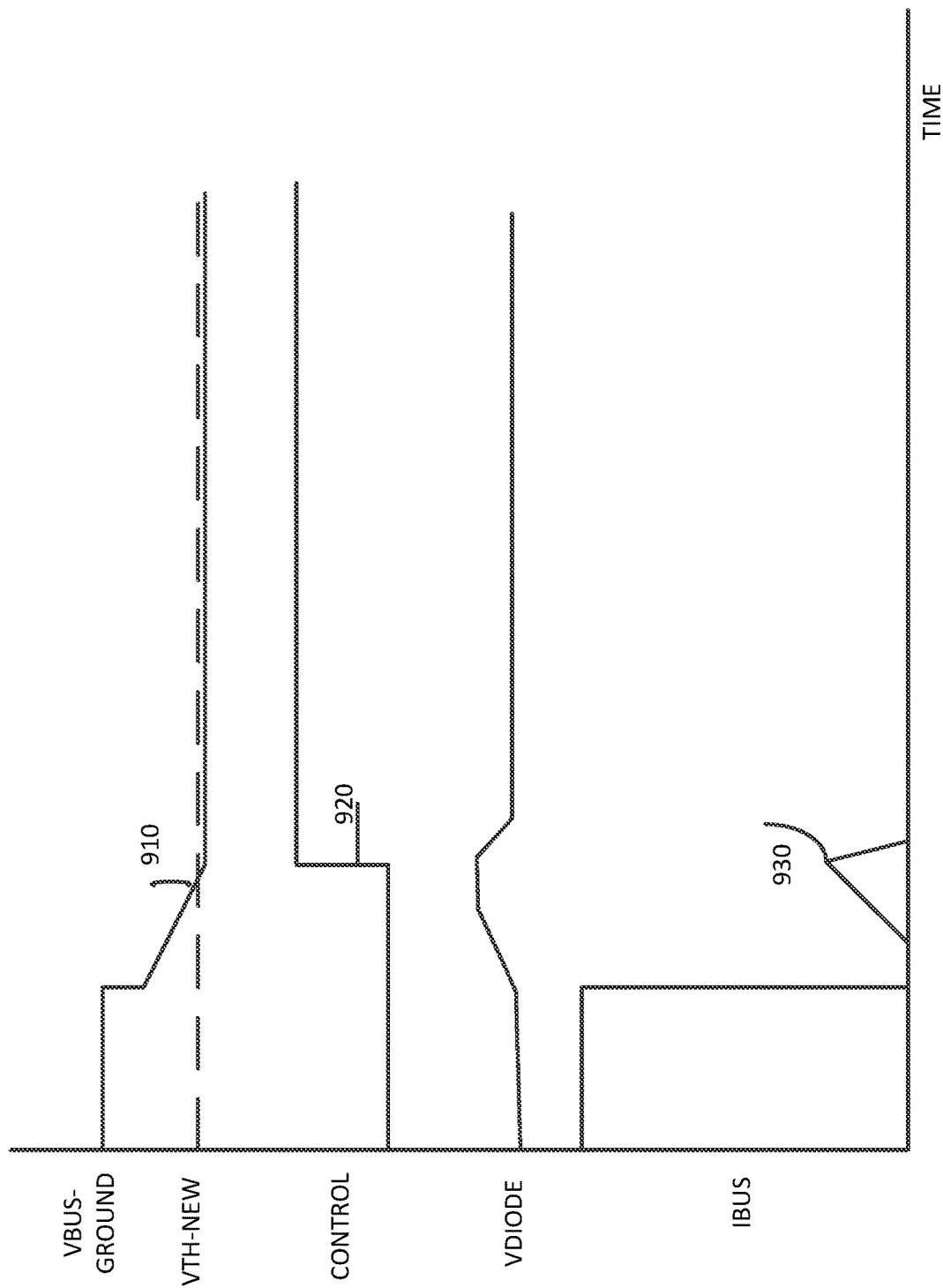
FIG. 9 is a timing diagram showing voltages and currents in the circuitry of FIG. 5 were a received VBUS power supply has increased and a threshold voltage has similarly increased.

FIG. 9 is a timing diagram showing voltages and currents in the circuitry of FIG. 5 were a received VBUS power supply has increased and a threshold voltage has similarly increased. As before, the net VBUS voltage may reach the threshold voltage at time 910. This may cause the control signal output of the other voltage lockout circuit to go high at time 920. This in turn may cause the charging regulator 420 to provide a high impedance between its power supply and ground terminals. This may block current from the diode at time 930, as before.

In other embodiments of the present invention, instead of detecting a drop in VBUS voltage, a drop in the VBUS power supply current may be detected and used to increase in impedance the charging regulator. An example is shown in the following figure.

Figure 10:
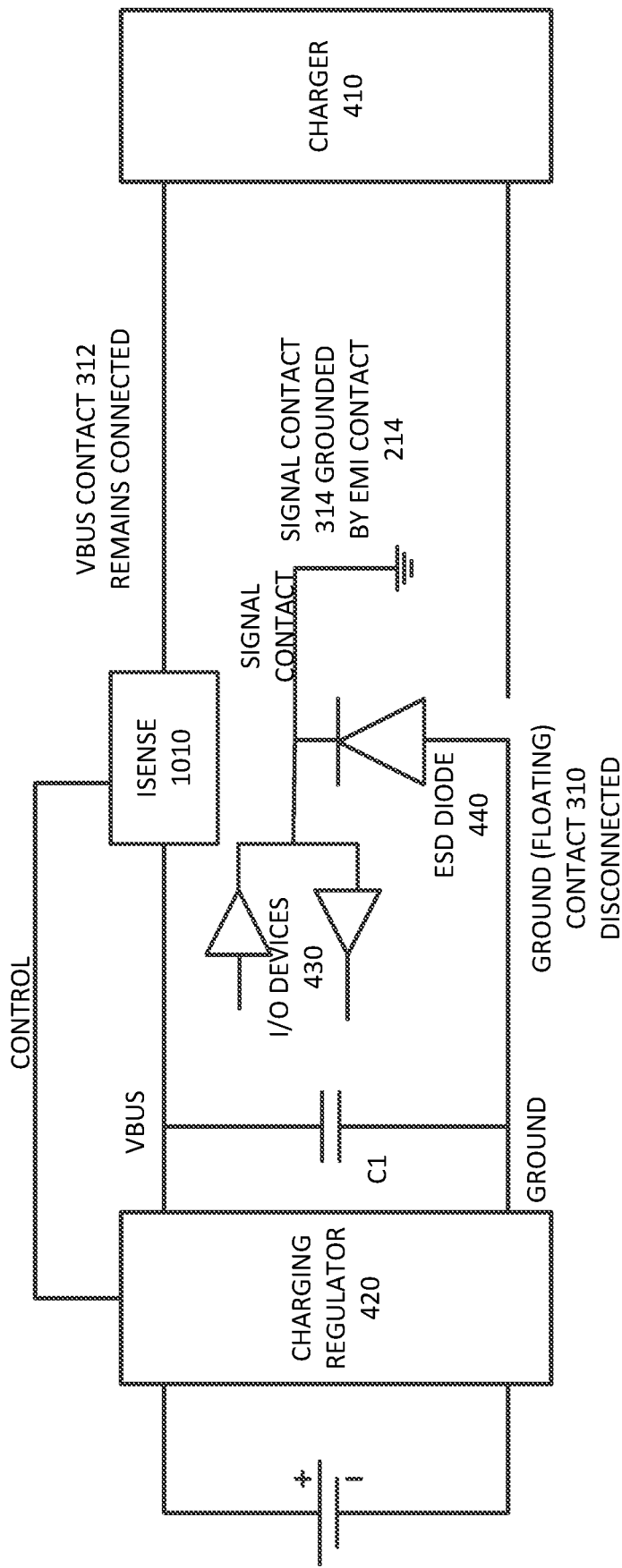
FIG. 10 illustrates circuitry for a connector receptacle according to an embodiment of the present invention.

FIG. 10 illustrates circuitry for a connector receptacle according to an embodiment of the present invention. In this example, charger 410 may provide a VBUS power supply to ISENSE circuit 1010. ISENSE circuit 1010 may provide the VBUS power supply to charging regulator 420. ISENSE circuit 1010 may also provide a control output to charging regulator 420. ISENSE circuit 1010 may be part of the circuitry associated with the connector receptacle on the second device.

ISENSE circuit 1010 may detect a decrease in the current provided to charging regulator 420. Once this decrease in current is detected, the ISENSE circuit 1010 may provide a control input to increase the input impedance of the charging regulator 420. This may effectively reduce or shut off the flow of current through ESD diode 440 to ground. An example is shown in the following figure.

Figure 11:
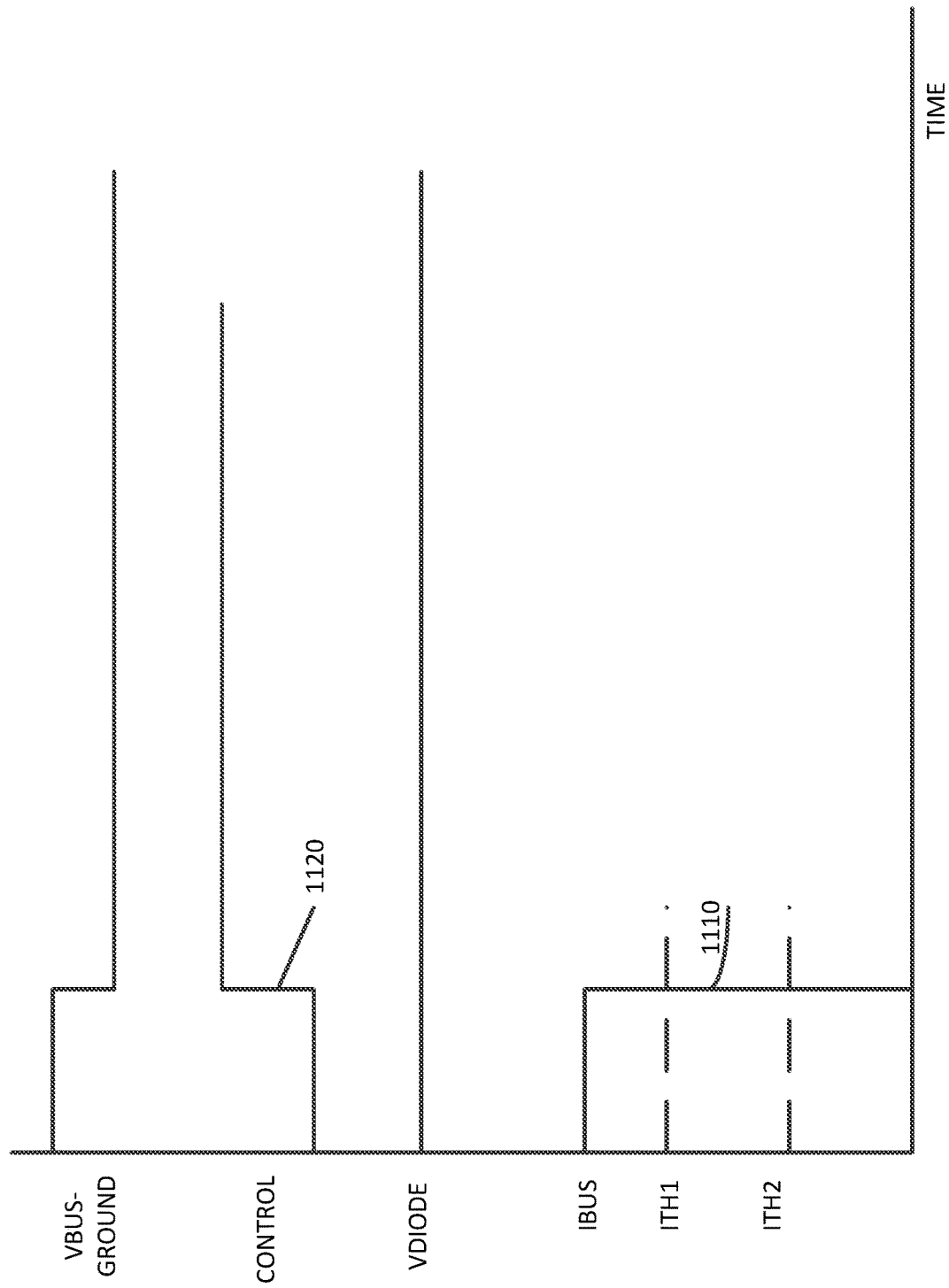
FIG. 11 illustrates a timing diagram of voltages and currents in the circuitry shown in FIG. 10.

FIG. 11 illustrates a timing diagram of voltages and currents in the circuitry shown in FIG. 10. Again, during a disconnection as a ground connection 410 is broken, the power supply current provided by VBUS power supply may fall at time 1110. In this example, this may be detected using one or more current thresholds. Once this disconnect is detected, a control voltage output of ISENSE circuit 1010 may go high at time 1120. This control input may instruct charging regulator 420 to increase the impedance between its power supply input and ground to a high impedance state. This may prevent current flow through ESD diode 440.

In various embodiments of the present invention, one or more current thresholds may be employed by ISENSE circuit 1010. For example, an embodiment of the present invention may use a single threshold to detect a drop in VBUS current. This single threshold may be fixed, or it may be dynamic. That is, it may be fixed or it may dynamically vary as a function of a recent average value of VBUS current. When VBUS current drops below the threshold, a high impedance may be placed in series with the VBUS line to reduce or shut off the VBUS current in the ESD diode. In another embodiment of the present invention, two current thresholds may be used. Again, these may be static or dynamic, or a combination thereof. For example, one or both thresholds may be fixed in value or they may track a recent average value of VBUS current. This dual-threshold arrangement may have less sensitivity to transient reductions in VBUS current. For example, a detect circuit may determine whether the current dropped from a first threshold to a second threshold within a set amount of time. If so, it may be determined that a disconnection has occurred and a high impedance may be placed in series with the VBUS line to reduce or shut off the VBUS current in the ESD diode. If not, it may be determined that a power supply glitch may have occurred.

Once VBUS current has been reduced or shut off, various criteria may be used to allow current to resume. In various embodiments of the present invention, a wait state may be imposed before current may be drawn from VBUS. For example, a wait time of 1, 5, 10, or 20 ms may be imposed before current may be drawn from VBUS following a disconnect. In these and other embodiments of the present invention, the net VBUS voltage (VBUS minus the local ground, which may be floating) may be monitored to determine whether full connection has again been made to a charging circuit. If the net VBUS voltage is not stable, but is instead decreasing or drooping, then the high-impedance state may be maintained. If the net VBUS voltage is stable, then the high-impedance may be removed and VBUS current flow may resume. Either or both of these or other techniques may be combined. For example, a wait time may be imposed. Following the wait time, the net VBUS voltage may be monitored to determine whether full connection has again been made to a charging circuit and that the VBUS voltage has stabilized.

Again, in certain circumstances during a connector insert disconnect, current may flow through charging regulator 420 and through ESD diode 440 to ground. Accordingly, these and other embodiments of the present invention may detect a current flowing through ESD diode 440. When a current flowing through ESD diode 440 is detected, a charging regulator 420 may be put in a high impedance state. An example is shown in the following figure.

Figure 12:
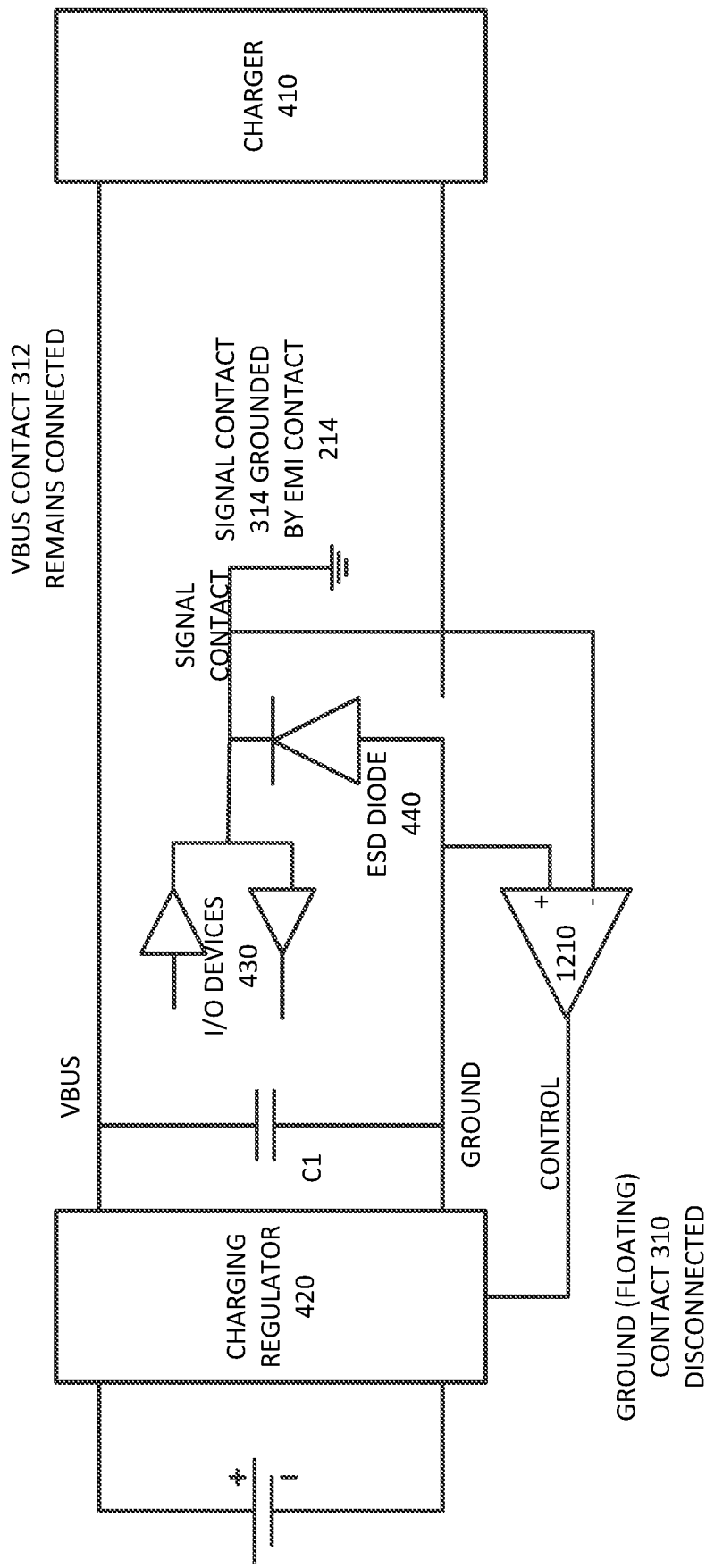
FIG. 12 illustrates circuitry for a connector receptacle according to an embodiment of the present invention.

FIG. 12 illustrates circuitry for a connector receptacle according to an embodiment of the present invention. In this example, comparator 1210 may have inputs connected to a cathode and an anode of ESD diode 440. As ESD diode 440 is forward biased, comparator 1210 may send a control signal to charging regulator 420. This control signal may put the charging regulator 420 into a state having a high impedance between its power supply input and ground. In this way, for the current flow through ESD diode 440 may be reduced or shut off. It should be noted that at this time the diode current may return to zero and the comparator 1210 may stop asserting the control signal to the charging regulator 420. Accordingly, comparator 1210 may include hysteresis to avoid this condition. In other embodiments of the present invention, a state machine may be employed to perform this function. A timing diagram showing the operation of this figure is shown in the following figure.

Figure 13:
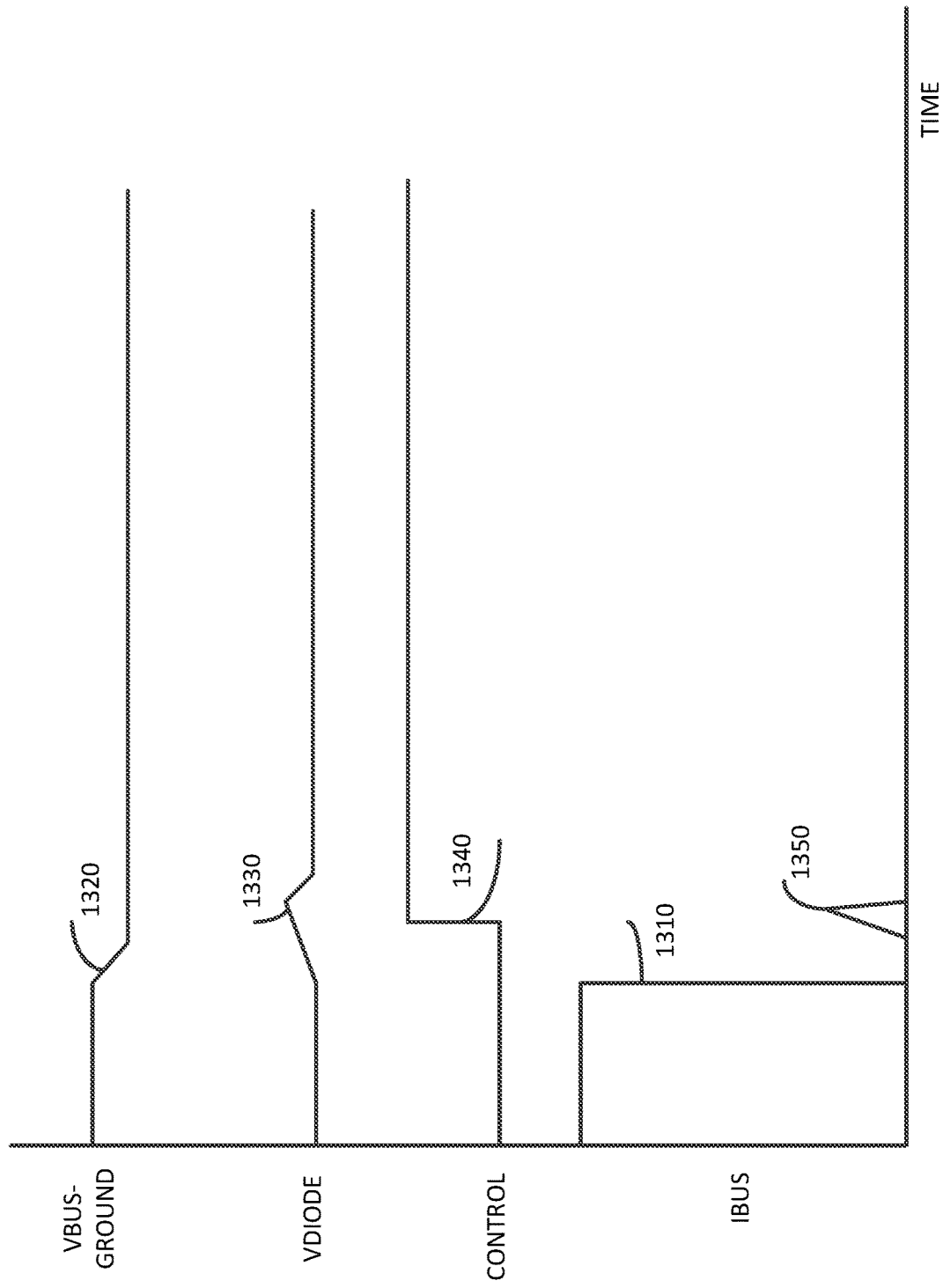
FIG. 13 is a timing diagram showing currents and voltages in the circuitry of FIG. 12.

FIG. 13 is a timing diagram showing currents and voltages in the circuitry of FIG. 12. As before, a disconnection of the ground contacts may cause a current received on a VBUS power supply to drop at time 1310. As before, the net VBUS voltage may start to decrease at time 1320, leading to current flow and the resulting voltage across the ESD diode at time 1330. This may cause the comparator control voltage CONTROL to go high at time 1340. This CONTROL signal may put the charging regulator 420 into a high impedance state, thereby blocking further current flow through the ESD diode at time 1350.

These and other embodiments of the present invention may detect a disconnect of the connector insert by detecting when one or more sides ground contacts of a connector insert is no longer in contact with a corresponding side contact on a connector receptacle tongue. An example is shown in the following figures.

Figure 14:
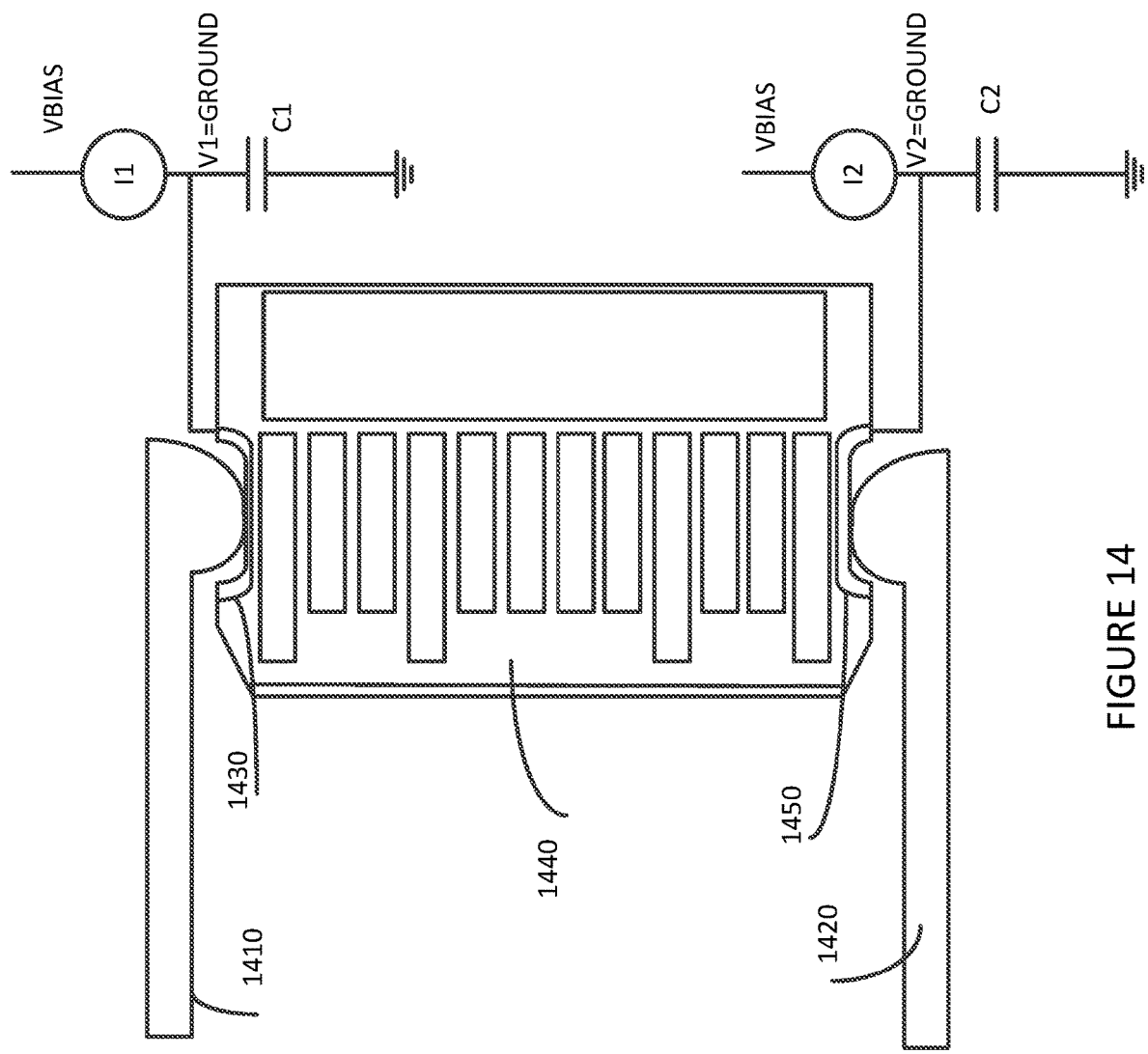
FIG. 14 illustrates an apparatus for detecting when side ground contacts of a connector insert are no longer in electrical contact with side contacts on a connector receptacle tongue.

FIG. 14 illustrates an apparatus for detecting when side ground contacts of a connector insert are no longer in electrical contact with side contacts on a connector receptacle tongue. In this example, side ground contact 1410 may be in electrical contact with contact 1430 on a side of connector receptacle tongue 1440. Similarly, side ground contact 1410 may be in electrical contact with contact 1450 on a side of connector receptacle tongue 1440. Connector receptacle tongue side contact 1430 may further be connected to a network including a current source and a capacitor to ground. The current source may be connected to a bias voltage VBIAS, which may be VBUS or other voltage. The current source may be a resistor or an actual current source. Similarly, connector receptacle tongue side contact 1450 may further be connected to a network including a current source and a capacitor to ground. This current source may also be connected to the VBIAS voltage, which again may be VBUS or other voltage. The current source may be a resistor or other current source. When connector receptacle tongue side contact 1430 is grounded through side ground contact 1410, V1 is at ground, and when connector receptacle tongue side contact 1450 is grounded through side ground contact 1420, voltage V2 is similarly at ground. Also, an AC path for AC return current may exist from ground in the connector insert, through the side ground contacts 1410 and 1420 in the connector insert, through the connector receptacle tongue side contacts 1430 and 1450, through the AC coupling capacitors C1 and C2, to ground in the connector receptacle. As the connector insert is removed, one of the connector receptacle tongue side contacts 1430 or 1450 may be allow to rise in voltage due to the corresponding current source I1 or I2. The V1 or V2 voltage may produce a control signal that may be received at a current regulator 420, as in the above examples. This received control voltage may change an impedance of a current regulator 420 to a high impedance state that may block current flow through the ESD diode 440, as before.

Figure 15:
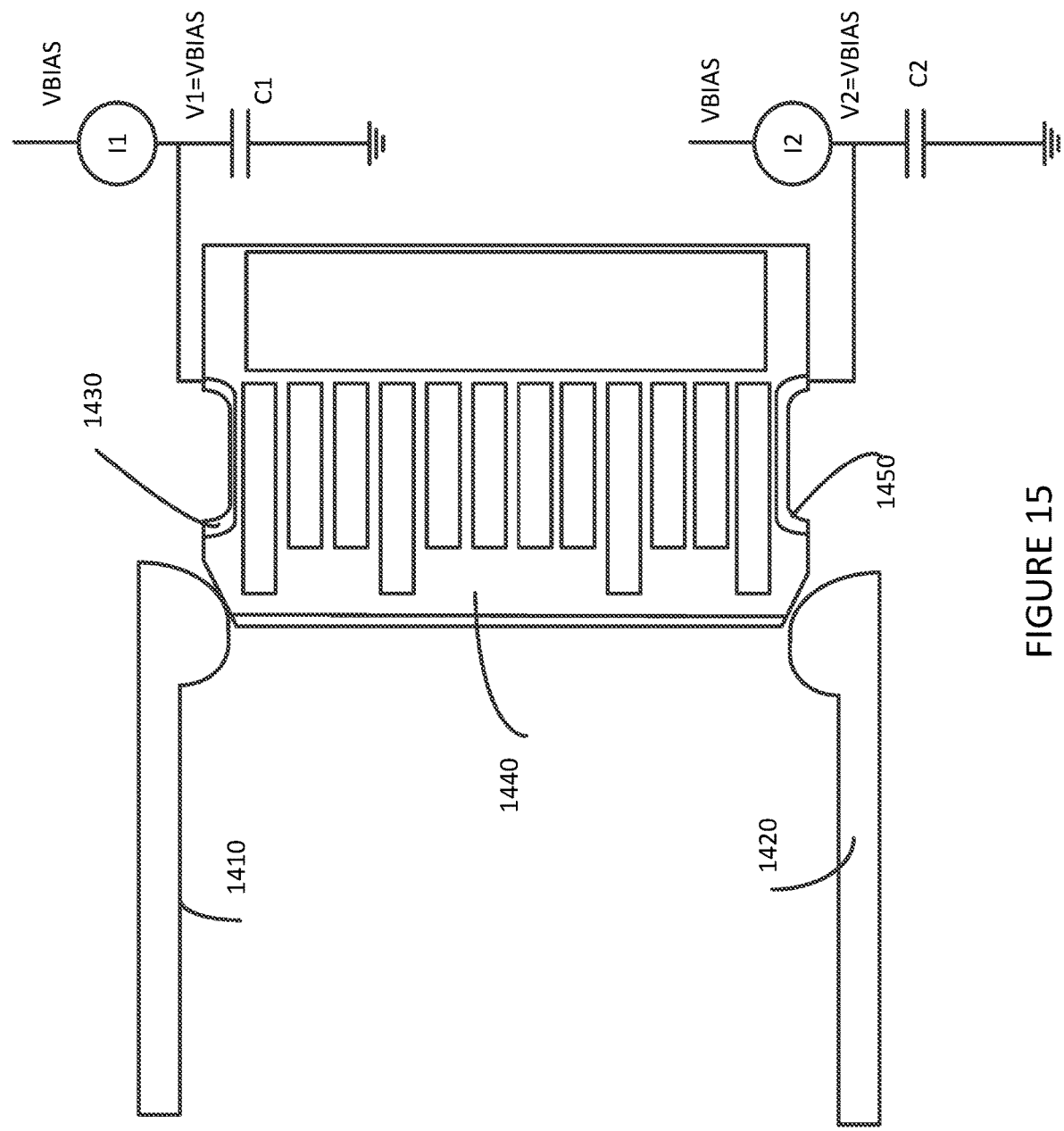
FIG. 15 illustrates the apparatus of FIG. 14 during an extraction of a connector insert.

FIG. 15 illustrates the apparatus of FIG. 14 during an extraction of a connector insert. In this example, connector receptacle side contacts 1430 and 1450 are no longer grounded by side ground contacts 1410 and 4020 in a connector insert. Accordingly, the voltages V1 and V2 may rise to VBIAS. Again, as soon as one of the connector receptacle tongue side contacts is disconnected, the corresponding one of the voltages V1 or V2 may go high, and a current regulator 420 may enter a high impedance state to block further current flow through ESD diode 440.

Various embodiments of the present invention may provide a high impedance in series with the current path through the ESD diode. This may be done by placing a switch in parallel with the high impedance in the current path. The switch may be a micro-electronic machine (MEM), a transistor, relay, or other type of switch. This switch may be opened in order to provide the high impedance in series with the current path through the ESD diode or closed to bypass the high impedance and provide a lower impedance. In these or other embodiments of the present invention, the charging circuit in the current path may be arranged to provide a variable impedance. This variable impedance may be increased to provide a high impedance in series with the current path through the ESD diode.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A circuit for a Universal Serial Bus Type-C™ connector receptacle, the circuit housed in an electronic device and comprising:
 a charging regulator having a first input coupled to receive a Bus Voltage (VBUS) power supply from a source external to the electronic device and a second input coupled to receive a ground;
 a battery having a first input coupled to a first output of the charging regulator and a second input coupled to a second output of the charging regulator; and
 an under-voltage lockout having a first input coupled to the first input of the charging regulator, a second input coupled to the second input of the charging regulator, an output coupled to a control input of the charging regulator, and a threshold voltage input to receive a threshold voltage, wherein the threshold voltage is generated relative to a latest average value of the VBUS power supply received at the first input of the charging regulator,
 wherein the under-voltage lockout provides a signal from the output of the under-voltage lockout to the control input of the charging regulator when the received VBUS power supply drops below the threshold voltage and in response, the charging regulator provides a high impedance between the first input and the second input of the charging regulator.

2. The circuit of claim 1 wherein the charging regulator provides the high impedance by opening a switch between the first input and the second input of the charging regulator.

3. The circuit of claim 2 further comprising a first integrated circuit having an Electrostatic Discharge (ESD) diode having an anode coupled to the second input of the charging regulator and a cathode coupled to a signal contact of the connector receptacle.

4. The circuit of claim 3 wherein the charging regulator is formed on the first integrated circuit.

5. The circuit of claim 3 wherein the charging regulator is formed on a second integrated circuit.

6. A circuit for a Universal Serial Bus Type-C™ connector receptacle, the circuit comprising:
   a current sensing circuit having a first input coupled to receive a Bus Voltage (VBUS) power supply, a first output coupled to provide the VBUS power supply, and a second output;
   a charging regulator having a first input coupled to receive the VBUS power supply from the first output of the current sensing circuit and a second input coupled to receive a ground; and
   a battery having a first input coupled to a first output of the charging regulator and a second input coupled to a second output of the charging regulator,
   wherein the second output of the current sensing circuit is coupled to a control input of the charging regulator,
   wherein the current sensing circuit provides a signal from the second output of the current sensing circuit to the control input of the charging regulator when the current from the VBUS power supply drops from a first threshold to a second threshold within a first duration, and in response, the charging regulator provides a high impedance between the first input and the second input of the charging regulator, and
   wherein the current sensing circuit does not provide the signal from the second output of the current sensing circuit to the control input of the charging regulator when the current from the VBUS power supply drops from the first threshold to the second threshold after the first duration, and in response, the charging regulator does not provide the high impedance between the first input and the second input of the charging regulator.

7. The circuit of claim 6 wherein the charging regulator provides the high impedance by opening a switch between the first input and the second input of the charging regulator.

8. The circuit of claim 7 further comprising a first integrated circuit having an ESD diode having an anode coupled to the second input of the charging regulator and a cathode coupled to a signal contact of the connector receptacle.

9. The circuit of claim 8 wherein the charging regulator is formed on the first integrated circuit.

10. The circuit of claim 8 wherein the charging regulator is formed on a second integrated circuit.

11. A circuit for a Universal Serial Bus Type-C™ connector receptacle, the circuit comprising:
    a charging regulator having a first input coupled to receive a VBUS Bus Voltage (VBUS) power supply and a second input coupled to receive a ground;
    a battery having a first input coupled to a first output of the charging regulator and a second input coupled to a second output of the charging regulator;
    a first integrated circuit having an Electrostatic Discharge (ESD) diode having an anode coupled to the second input of the charging regulator and a cathode coupled to a signal contact of the connector receptacle; and
    a comparator having a first input coupled to the anode of the ESD diode, a second input coupled to the cathode of the ESD diode, and an output coupled to a control input of the charging regulator,
    wherein the comparator provides a signal from the output of the comparator to the control input of the charging regulator when the cathode voltage of the ESD diode drops below the anode voltage of the ESD diode, and in response, the charging regulator provides a high impedance between the first input and the second input of the charging regulator.

12. The circuit of claim 11 wherein the charging regulator provides the high impedance by opening a switch between the first input and the second input of the charging regulator.

13. The circuit of claim 12 wherein the charging regulator is formed on the first integrated circuit.

14. The circuit of claim 12 wherein the charging regulator is formed on a second integrated circuit.

15. The circuit of claim 6 wherein after the charging regulator provides the high impedance between the first input and the second input of the charging regulator, the current sensing circuit waits a second duration before not providing a high impedance between the first input and the second input of the charging regulator.

* * * * *